(12) United States Patent
Li et al.

(10) Patent No.: US 9,301,198 B2
(45) Date of Patent: Mar. 29, 2016

(54) COOPERATIVE RADIO ACCESS NETWORK WITH CENTRALIZED BASE STATION BASEBAND UNIT (BBU) PROCESSING POOL

(75) Inventors: Guangjie Li, Beijing (CN); Xuebin Yang, Beijing (CN); Senjie Zhang, Beijing (CN); Tin-Fook Ngai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/993,255

(22) PCT Filed: Feb. 24, 2012

(86) PCT No.: PCT/CN2012/071572
§ 371 (c)(1),
(2), (4) Date: Nov. 15, 2013

(87) PCT Pub. No.: WO2013/123670
PCT Pub. Date: Aug. 29, 2013

(65) Prior Publication Data
US 2014/0269322 A1  Sep. 18, 2014

(51) Int. Cl.
*H04W 28/08* (2009.01)
*H04W 88/08* (2009.01)

(52) U.S. Cl.
CPC ............ *H04W 28/08* (2013.01); *H04W 88/085* (2013.01)

(58) Field of Classification Search
CPC . H04W 28/08; H04W 28/085; H04W 88/085; H04W 52/0206; H04W 72/0486; H04W 16/04; H04W 72/04; H04W 72/1215; H04W 36/04; H04W 36/06; H04W 36/14; H04W 24/02; H04W 47/125; H04L 5/0032; Y02B 60/50; H04B 10/25753; H04B 10/25752; H04B 10/25759

USPC .............. 370/229, 230.1, 232, 235, 236, 254, 370/255, 280, 311, 314, 328, 330, 331, 338, 370/410, 426, 437, 469
See application file for complete search history.

(56) References Cited

U.S. PATENT DOCUMENTS

2005/0245267 A1* 11/2005 Guethaus ...................... 455/450
2007/0177552 A1*  8/2007 Wu et al. ........................ 370/335
(Continued)

FOREIGN PATENT DOCUMENTS

CN   101505500 A   8/2009
CN   101541041 A   9/2009
(Continued)

OTHER PUBLICATIONS

Zhang et al., "Base Band Pool Device, and Method for Implementing Base Band Data Swtcih Thereof", Dec. 23, 2010, WO, WO 2020/145448 machine translation.*
(Continued)

*Primary Examiner* — Gary Mui
*Assistant Examiner* — Michael Phillips
(74) *Attorney, Agent, or Firm* — Schwegman Lundberg & Woessner, P.A.

(57) ABSTRACT

Embodiments of an enhanced Node B (eNB) configured for use in a cooperative radio access networks (C-RAN) and method for central baseband unit (BBU) processing are generally described herein. In some embodiments, the eNB may include a baseband unit (BBU) processing pool comprising a plurality of processing units. The BBU processing pool is configured to share the processing load of several sectors. A control unit may monitor the processing load of the processing units and perform dynamic load sharing by migrating the baseband processing between the processing units without changing a carrier used by user equipment operating with a sector.

14 Claims, 9 Drawing Sheets

(56) References Cited

U.S. PATENT DOCUMENTS

| | | | |
|---|---|---|---|
| 2007/0230328 A1* | 10/2007 | Saitou | 370/210 |
| 2010/0113095 A1 | 5/2010 | Carmon et al. | |
| 2012/0014269 A1* | 1/2012 | Ray et al. | 370/252 |
| 2012/0044818 A1* | 2/2012 | Lindoff et al. | 370/252 |
| 2012/0129517 A1* | 5/2012 | Fox et al. | 455/425 |
| 2012/0155446 A1* | 6/2012 | Machida | 370/338 |
| 2012/0202507 A1* | 8/2012 | Zhang et al. | 455/450 |
| 2013/0100907 A1* | 4/2013 | Liu | 370/329 |
| 2013/0136068 A1* | 5/2013 | Johansson et al. | 370/329 |
| 2014/0018090 A1* | 1/2014 | Khoryaev et al. | 455/452.1 |
| 2014/0029431 A1* | 1/2014 | Haberland et al. | 370/235 |
| 2014/0226736 A1* | 8/2014 | Niu et al. | 375/260 |
| 2014/0241315 A1* | 8/2014 | Niu et al. | 370/331 |
| 2014/0286643 A1* | 9/2014 | George et al. | 398/115 |

FOREIGN PATENT DOCUMENTS

| | | |
|---|---|---|
| CN | 102340825 A | 2/2012 |
| EP | 0765584 A2 | 4/1997 |
| EP | 1450572 A1 | 8/2004 |
| JP | 2007019724 A | 1/2007 |
| WO | WO-2005032168 A2 | 4/2005 |
| WO | WO 2010/145448 * | 12/2010 |
| WO | WO-2011029497 A1 | 3/2011 |
| WO | WO-2011127855 A2 | 10/2011 |

OTHER PUBLICATIONS

"International Application Serial No. PCT/CN2012/011572, International Search Report mailed Dec. 13, 2012".

"International Application Serial No. PCT/CN2012/071572, Written Opinion mailed Dec. 13, 2012".

"European Application Serial No. 12869474.2, Extended European Search Report mailed Sep. 29,2015", 8 pgs.

* cited by examiner

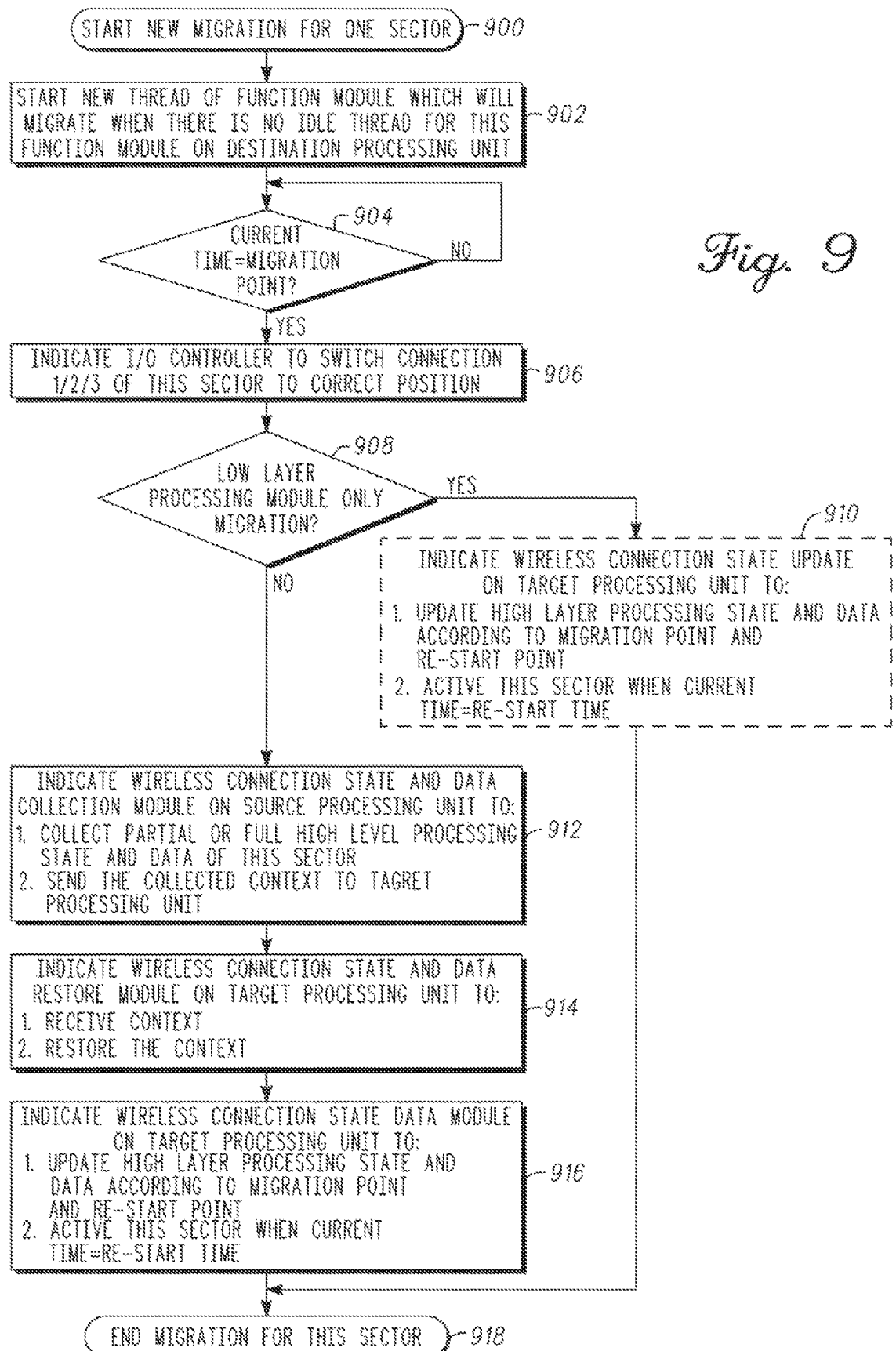

COOPERATIVE RADIO ACCESS NETWORK WITH CENTRALIZED BASE STATION BASEBAND UNIT (BBU) PROCESSING POOL

This application is a U.S. National Stage Filing under 35 U.S.C. 371 from International Application No. PCT/CN2012/071572, filed on Feb. 24, 2012, which is incorporated herein by reference in its entirety.

TECHNICAL FIELD

Embodiments pertain to wireless communications. Some embodiments relate to cooperative radio access networks (C-RANs). Some embodiments relate to 3GPP LTE networks.

BACKGROUND

C-RANs are a next generation wireless network infrastructure being actively explored by the cellular communication industry worldwide aiming at reducing the total cost of ownership (TCO) of operators by centralized baseband unit (BBU) processing and remote-connected remote radio units (RRU). However, in order to realize full advantages of a C-RAN, there are still several challenges remained to be addressed. These include cost-effective long distance fiber connections, large-scale, scalable BBUs, dynamic load sharing and fault tolerance, among others.

Thus there are general needs for C-RANs with centralized BBU processing and methods for operating C-RANs. There are general needs for C-RANs with centralized BBU processing and methods for operating C-RANs with reduced power consumption, improved performance, and reduced TCO.

BRIEF DESCRIPTION OF THE DRAWINGS

FIG. 9 illustrates a migration process for a single sector in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
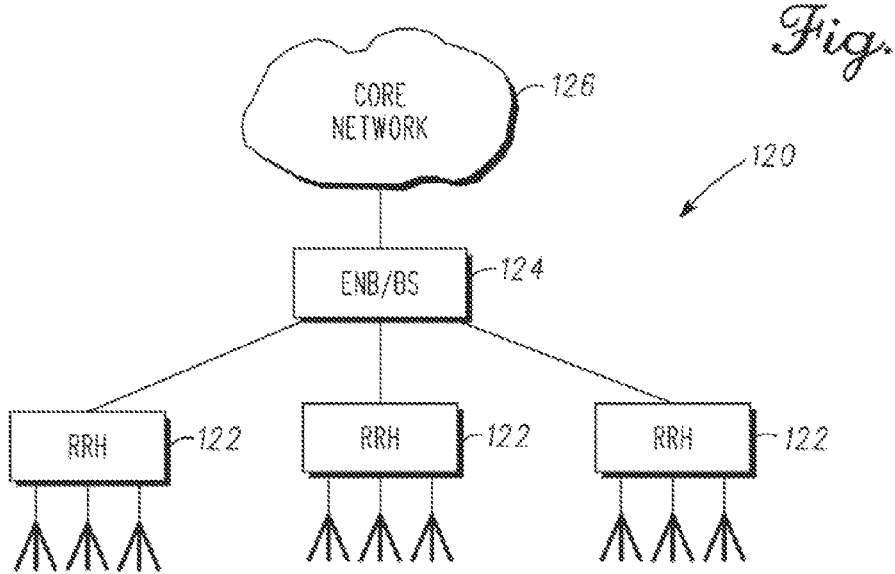
FIG. 1A illustrates a C-RAN in accordance with some embodiments.

FIG. 1A illustrates a C-RAN in accordance with some embodiments. C-RAN 120 includes an enhanced or evolved node B (eNB) 124 and a plurality or remote radio heads (RRHs) 122 (also referred to as remote radio units (RRUs)). The RRHs 122 may communicate with mobile stations, such as use equipment (UE) located within various sectors of cells. The eNB 124 may be coupled to a core network 126. In accordance with embodiments, C-RAN 120 may implement centralized baseband unit (BBU) processing as described in more detail below.

Figure 1B:
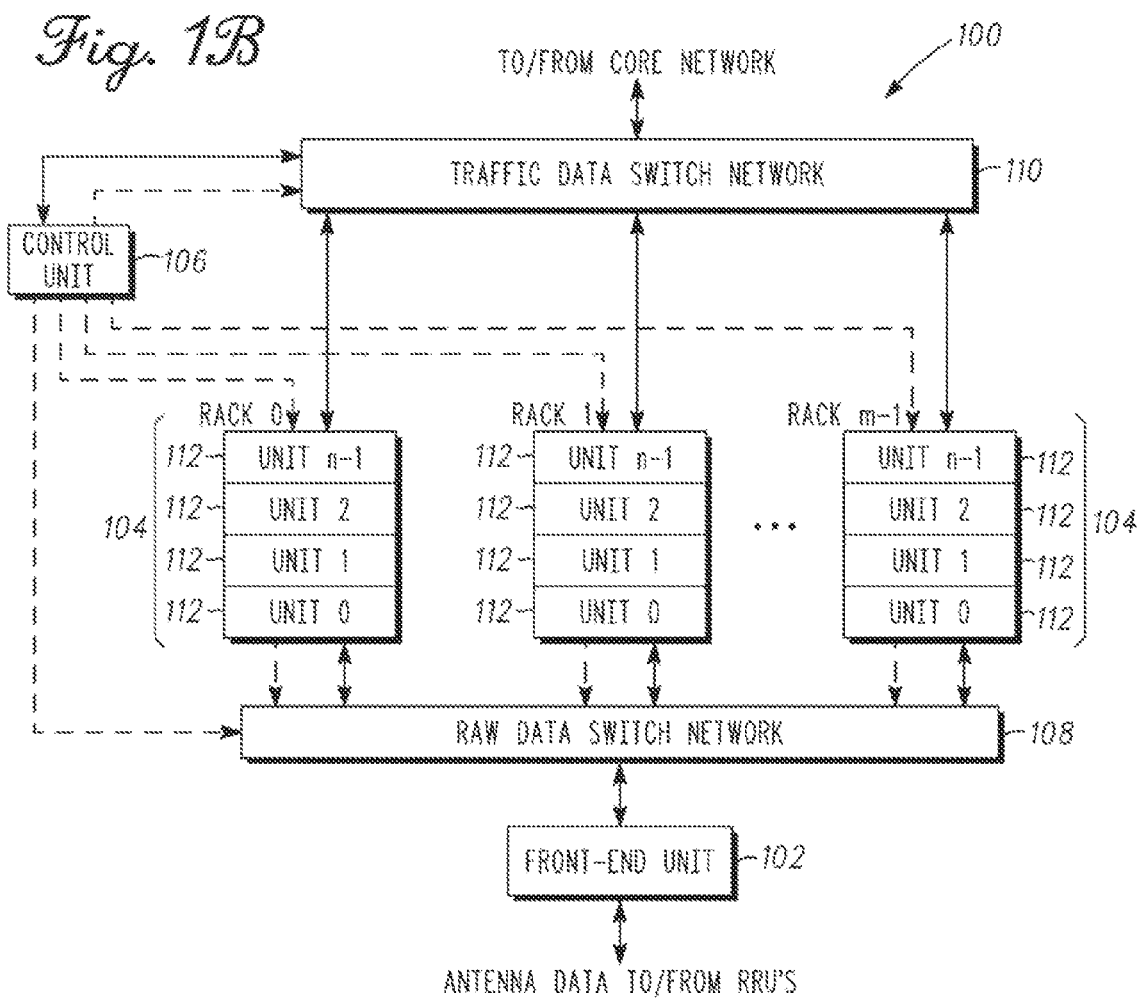
FIG. 1B illustrates a centralized BBU processing hardware architecture in accordance with some embodiments.

FIG. 1B illustrates a centralized BBU processing hardware architecture in accordance with some embodiments. Hardware architecture 100 includes a front-end unit 102, a BBU processing pool 104, a control unit 106, a raw data switch network 108 and a traffic data switch network 110. The BBU processing pool 104 may include a plurality of processing units 112. The front-end unit 102 may communicate information (e.g., antenna data) with RRHs 122 (FIG. 1A). The traffic data switch network 110 may communicate with the core network 126 (FIG. 1). The functional elements of hardware architecture 100 may be part of a single base station (e.g., enhanced/evolved node Bs (eNBs)) (or several base stations) that is coupled with a plurality of RRHs 122 or RRUs illustrated in FIG. 1A. RRHs may be viewed as distributed base stations. In FIG. 1B, control signals are indicated with dashed lines and data signals are indicated with solid lines.

In accordance with the embodiments described herein, the hardware architecture 100 may be configured for dynamic load sharing and power saving. In these embodiments, the load of base station cell or sector processing may be dynamically shared by the centralized BBU pool 104 which may reduce overall processing power consumption. For example, the "tide effect" is the typical usage scenario in which urban and suburban base stations have different load profiles over a twenty-four hour period. The traffic load is somewhat complementary between urban and suburban base stations. In accordance with embodiments, through dynamic load sharing, the peak processing capacity of the centralized BBU pool 104 may be reduced since the processing is shared (e.g., between these two types of base stations).

Dynamically load sharing is a key feature of hardware architecture 100 which may greatly reduce power consumption. For example, in the middle of the night, the traffic load may be less than 1% of the daytime traffic load. In this case, the processing of hundreds of base stations may be performed the centralized BBU pool 104 of the hardware architecture 100 (e.g. in one server) and other units may be powered off to reduce power consumption.

In accordance with some embodiments, the hardware architecture 100 may be configured to dynamically route the RRU data to a different processing unit 112 in the BBU, support load migration to processing units 112 (including monitoring and decision), and provide for power-off and wake-up for a specific processing unit 112. These embodiments are described in more detail below.

Some embodiments may be configured to implement one or more wireless communication protocols such as the LTE protocol in accordance with an Evolved Universal Terrestrial Radio Access Network (E-UTRAN), Long-Term Evolution (LTE), 3rd Generation Partnership Project (3GPP) standard. In these embodiments, the RRHs 122 may be configured to communicate uplink and downlink frames with UEs in accordance with an orthogonal frequency division multiple access (OFDMA) technique.

Although many embodiments are described herein with respect to the LTE protocol/standard, the scope of the embodiments is not limited in this respect. The hardware architecture 100 (FIG. 1B) including software architecture 600 (FIG. 6) may be suitable for use with other standards and protocols in which a layer-structure is adopted.

In some embodiments, a UE may comprise a portable wireless communication device, such as a personal digital assistant (PDA), a laptop or portable computers with wireless communication capability, a web tablet, a wireless telephone or smart phone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, a UE may include one or more of a keyboard, a display, a non-volatile memory port, multiple antennas, a graphics processor, an application processor, speakers, and other mobile device elements. The display may be an LCD screen including a touch screen.

In some embodiments, each RRH 122 and UE may utilize plurality of antennas. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between devices.

Figure 2:
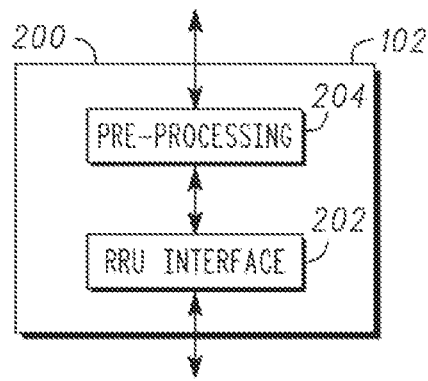
FIG. 2 is a block diagram of a front-end unit in accordance some embodiments.

FIG. 2 is a block diagram of a front-end unit in accordance with some embodiments. Front-end unit 200 may be suitable for use as front-end unit 102 (FIG. 1B) although other configurations may also be suitable. Front-end unit 200 includes a RRU interface 202 and pre-processing unit 204. In accordance with embodiments, the RRU interface 202 may include fiber and circuitry for multiplexing and demultiplexing (MUX/DEMUX). The fiber may have several carriers and lines. The MUX/DEMUX may be able to demultiplex/multiplex the antenna data to/from one sector(s)/cell(s) for processing by the pre-processing unit 204.

In some embodiments, the pre-processing unit 204 may be configured to process "fixed" functions of cellular signal processing. Fixed functions refer to processing complexity that does not vary according to the traffic load.

Figure 3:
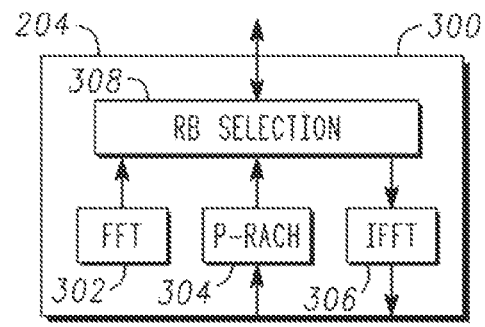
FIG. 3 is a block diagram of a pre-processing unit in accordance with some embodiments.

FIG. 3 illustrates a block diagram of a pre-processing unit in accordance with some embodiments. Pre-processing unit 300 may be suitable for use as pre-processing unit 204 (FIG. 2) and may be suitable for use in implementing the LTE protocol. Pre-processing unit 300 may include a fast-Fourier transform (FFT) processing unit 302, a Physical Random Access Channel (PRACH) processing unit 304, and inverse-FFT (IFFT) processing unit 306 and a resource block (RB) selection unit 308. When implementing the LTE protocol, the FFT/IFFT, P-RACH functions may be considered fixed functions which may be performed by pre-processing unit 300.

Figure 4:
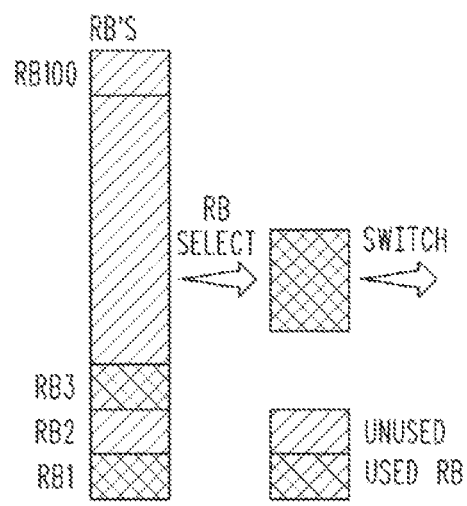
FIG. 4 illustrates resource block selection in accordance with some embodiments.

FIG. 4 illustrates resource block selection in accordance with some embodiments. In these embodiments, the RB selection unit 308 (FIG. 3) may perform a RB selection function to extract and fill a used radio resource block. The used radio resource block may be extracted for future BBU processing and unused radio resource block may be discarded.

In some embodiments, a MAC scheduler may proactively indicate to the RB selection unit 308 which RBs are used. For example, in the LTE protocol, in a curtain subframe, the MAC scheduler may decide the RB schedule for upcoming uplink subframes.

The functions of the pre-processing unit 300 may operate completely within the BBU processing pool 104 (FIG. 1B), may operate totally within the RRU interface 202, or may operate partially in the BBU processing pool 104 and partially in the RRU interface 202. In an embodiment in which the pre-processing unit 203 operates partially in the BBU processing pool 104 and partially in the RRU interface 202, the FFT/IFFT/PRACH functions may be performed in the RRU interface 202 and RB selection may be performed in the BBU processing pool 104.

In some embodiments, three options for pre-processing by the pre-processing unit 300 are provided. Option 1: all of the preprocessing may be done at the base station which is in a room. Option 2: all preprocessing may be done in the RRH which is out of the room. Option 3: part of the preprocessing may be done in the base station and the remaining processing may be done at in the RRHs.

Figure 11A:
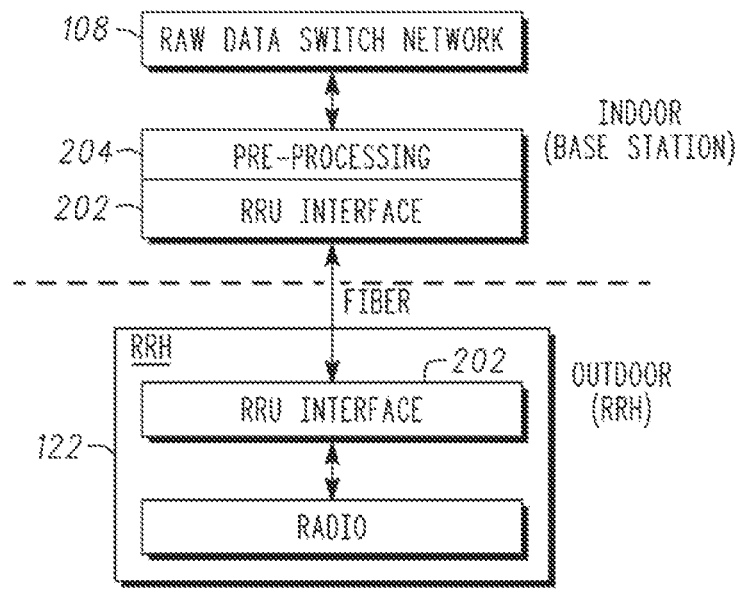
FIG. 11A illustrates embodiments in which preprocessing is performed in a base station.
Figure 11B:
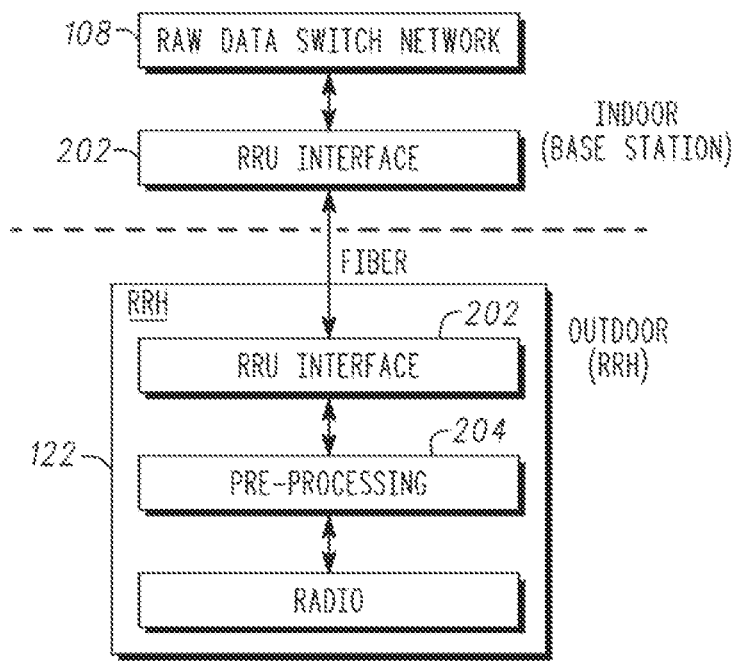
FIG. 11B illustrates embodiments in which preprocessing is performed in an RRH.
Figure 11C:
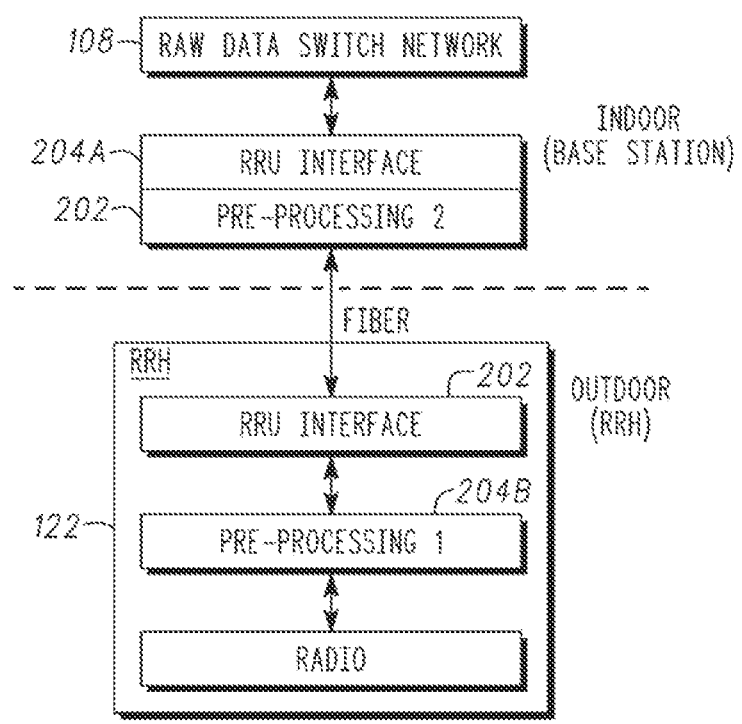
FIG. 11C illustrates embodiments in which preprocessing is performed partially in the base station and partially in one or more RRHs.

FIG. 11A illustrates embodiments in which preprocessing is performed in a base station. FIG. 11B illustrates embodiments in which preprocessing is performed in an RRH. FIG. 11C illustrates embodiments in which preprocessing is performed partially in the base station and partially in one or more RRHs. In the embodiments illustrated in FIG. 11C, the preprocessing performed at the base station may be performed by pre-processing unit 204A and may include RB selection for the uplink and RB filling for the downlink. The preprocessing performed at the RRU 122 may be performed by pre-processing unit 204B and may include FFT/IFFT and PRACH filter functions.

Through the operation of the pre-processing unit 300, the data load for the raw data switch network 108 (FIG. 1B) may be greatly reduced and the load from additional cells and sectors may be consolidated in fewer processing units for power savings. For example, in the middle of the night when the traffic load is very low, the user data traffic after pre-processing is very light for processing.

In accordance with some embodiments, the raw data switch network 108 (FIG. 1B) may be a switch network that configurable to switch data from the front-end 102 unit to an indicated processing unit 112 of the BBU processing pool 104 depending on the scale. For example, if the cell/sector scale is large (e.g. 1000+), several independent C-RAN BBU pools may be employed.

In some embodiments, the BBU processing pool 104 may operate as a single BBU processing center. Each processing unit 112 of the BBU processing pool 104 may, for example, be a blade server with multiple CPUs. The processing units 112 may be controlled by the control unit 106 and may act as worker units for protocol processing. In some of these embodiments, a base-station sector may be used as the minimum load for dynamic load sharing. One processing unit 112 may be configured to process the load from several base-station sectors.

In accordance with embodiments, when the load of one processing unit 112 becomes high (e.g., exceeds a predetermined threshold), the control unit 106 may indicate to off-load one or more sectors to one or more other processing units 112. The user equipment (UEs) (e.g., mobile devices) operating within the sector that is off loaded do not need to be involved in this migration process because the processing units 112 are changed instead of the air interface. In embodiments that implement an LTE protocol, a processing unit 112 may perform processing for the physical (PRY) layer, the media-access control (MAC) layer, and the RLC and PDCP layers.

In some embodiments, the control unit 106 may operate as the central controller for hardware architecture 100. The control unit 106 may process the control plane of the protocol for the sectors, may act as the interface to the core network, may control the dynamic load sharing, and may monitor and control the power saving of processing units 112. Some of these embodiments are described in more detail below.

Figure 5:
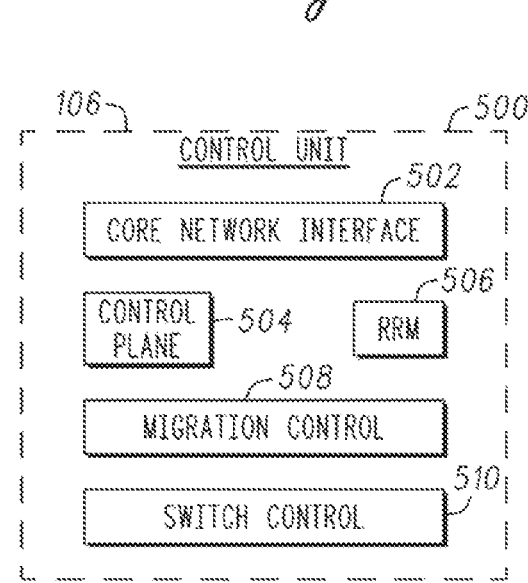
FIG. 5 is a functional block diagram of a control unit in accordance with some embodiments.

FIG. 5 is a functional block diagram of a control unit in accordance with some embodiments. Control unit 500 may be suitable for use as control unit 106 (FIG. 1B), although other configurations may also be suitable. In these embodiments, the control unit 500 may include a core network interface 502, a control plane 504, a radio-resource manager (RRM) 506, migration control element 508, and a commutation or switch control unit 510.

In some embodiments, the core network interface 502 may act as the core network interface end-point for the operations being performed for various cells/sectors in the BBU processing pool 104. For example, the core network interface 502 may provide the S1 or X2 interfaces.

The control plane 504 may process the control plane protocol for the operations being performed for various cells/sectors in the BBU processing pool 104. In embodiments that implement the LTE protocol, a radio-resource control (RRC) related protocol may be implemented by the control plane 504.

The RRM 506 may manage the radio resource and bearers in the BBU processing pool 104 for the various cells/sectors. In some embodiments, the RRM 506 may be configured for the interference coordination between sectors and may perform load balancing between neighboring cells/sectors.

The migration control element 508 may be configured to manage the BBU processing pool 104 (FIG. 1B). The migration control element 508 may monitor the computation load of the processing unit 112 (FIG. 1B) and may determine when and how to migrate the load of certain cells/sectors to other processing units 112. It may also provide a power-off and power-on command to the processing unit 112. In some embodiments, the migration control element 508 may be configured to cooperate with the RRM 506 and the control plane 504 to determine when and how to perform cell/sector migration among processing units 112 of the BBU processing pool 104.

In some embodiments, the migration control element 508 may monitor the active connections from the RRM 506 and the control plane 504 and trigger the migration based on a number of critical connections (i.e., when the number is small).

The switch control unit 510 may be configured to control the raw data switch network 108 and the traffic data switch network 110 according to the decision of the migration control element 508 to switch corresponding antenna data and traffic data to certain processing units 112.

The traffic data switch network 110 may be configured to switch the traffic packets between core network and processing unit 112 of the BBU processing pool 104. Because of dynamic load sharing, packets for a certain cell/sector may be processed in different processing units 112. The traffic data switch network 110 may be configured to switch packets to/from each of the processing unit 112 of the BBU processing pool 104.

In an example embodiment, hardware architecture 100 may be configured to support up to one-thousand or more LTE base stations (eNBs) where each base station may including three sectors. These embodiments may utilize a 20 MHz bandwidth. These embodiments may also support both LTE time-division duplex (TDD) and LTE frequency-division duplex (FDD) configurations. One accelerator may be used FFT/IFFT/turbo encoding/decoding. In these embodiments, the computational load of one sector may be migrated from one processing unit 112 to another. Several low loaded carriers may be migrated to one processing unit and any non-utilized processing units 112 may be powered-off while all the carriers remain active. Based on network traffic load profiles, most processing units 112 may be powered off during the night achieving a significant reduction in power consumption that could not be achieved without centralized BBU processing in these embodiments, the mobile stations are not involved with the load migration process allowing the mobile stations to remain on the same carriers. In some embodiments, the control unit 106 may determine when to start migration to reduce impact on the communication links.

In accordance with embodiments, when the BBU pool 104 shares the computation load of several sectors and is able to dynamically allocate the processing load among several processing unit 112. In some embodiments, when the processing load of one processing unit is low (i.e., below a predetermined threshold), the processing may be migrated to another processing unit and the processing unit may be turned off. When the processing load of a processing unit 112 is high (i.e., above a predetermined threshold), the processing load of one or more sectors may be migrated to another processing unit 112. In some embodiments, the front-end processing or the link speed/capacity of the processing unit 112 may vary with the load conditions. In some embodiments, through the operation of the front-end unit 102, the throughput requirement of the interconnection switch may be tailored to the actual carrier load and can be greatly reduced.

Figure 6:
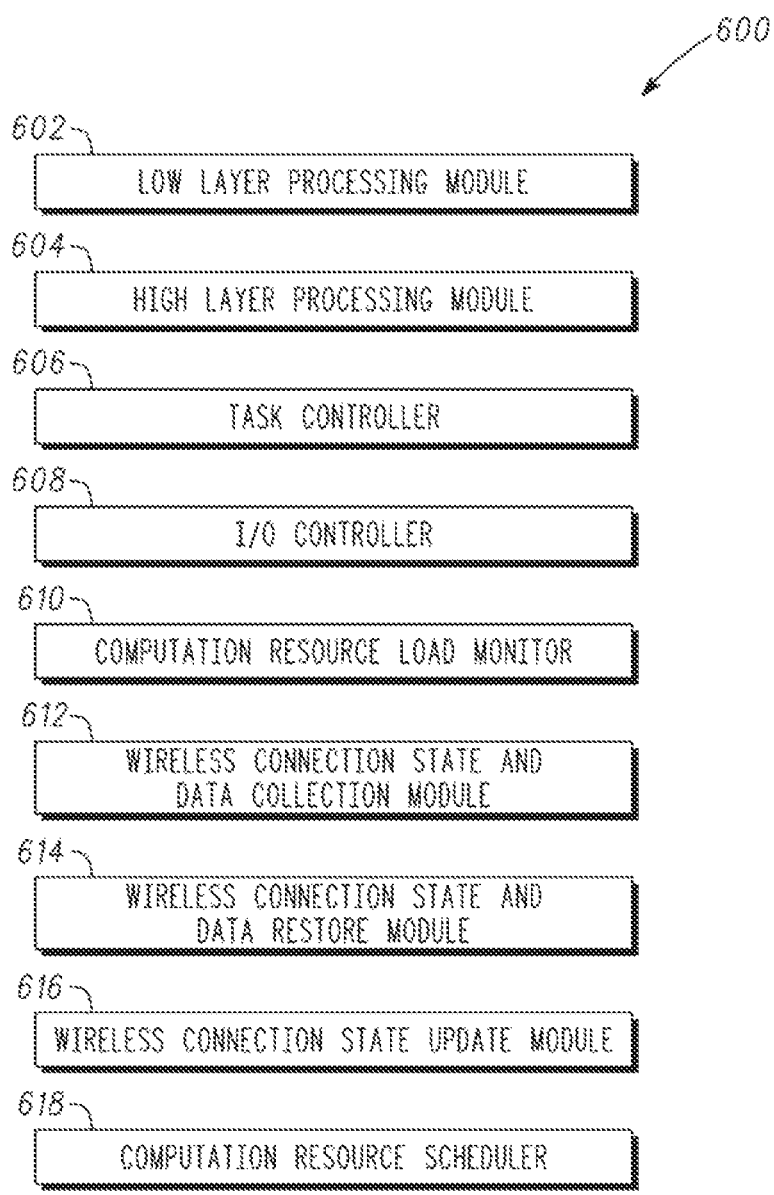
FIG. 6 illustrates modules of a software architecture to support baseband computation migration in accordance with some embodiments.

FIG. 6 illustrates modules of a software architecture to support baseband computation migration in accordance with some embodiments. The modules of software architecture 600 may be implemented by a next generation base station, including, for example, by hardware architecture 100 (FIG. 1B). As described in more detail below, the software architecture 600 may allow the computation load of one sector to be migrated from one processing unit to another. In these embodiments, several lightly loaded carriers may be migrated to one processing unit allowing a processing unit to be powered off without turning off the carriers provided by that processing unit.

Software architecture 600 may include a low layer processing module 602 for implementing lower layer operations a wireless communication protocol/standard, a high layer processing module 604 for implementing higher layer operations of the wireless communication protocol/standard, and a task controller 606 for controlling the operations of the low layer processing module 602 and the high layer processing module 604. The software architecture 600 may include an I/O controller 608, a computation resource load monitor 610, a wireless connection state and data collection module 612, a wireless connection state and data restore module 614, a wireless connection state update module 616 and a computation resource scheduler 618.

In accordance with embodiments, the low layer processing module 602 may, for example, processes physical (PHY)

layer functions such as FFT, IFFT, CRC, channel encoding/decoding, layer mapping for MIMO transmissions, equalization for MIMO receptions, and channel estimation for reception, as well as rate matching and de-matching in LTE embodiments. These lower layer processing functions may require more running time than functions performed by the high layer processing module 604 and may work according to a high layer indication. The results of the lower layer processing may depend on current subframe input.

In some embodiments, the high layer processing module 604 may process higher layer functions such as RRC, PDCP, RLC and MAC layer functions and other related functions such as RRM in LTE embodiments. The results of these higher layer functions generally depend on current subframe input as well as previous subframe input and results. The function of the high layer processing module 604 may, for example, reside in a single processing unit 112 (FIG. 1B) or may be distributed among several processing units, such as processing units 112. In some embodiments, the high layer processing module 604 and the low layer processing module 602 may operate together to provide reliable wireless connections between user equipment (UE) and the base station (e.g., an eNB). The task controller 606 may control the running flow of the low layer processing module 602 and the high layer processing module 604.

In some embodiments, the I/O controller 608 may control three connections. The I/O controller 608 may instruct a sector's high layer processing module 604 to create a first connection with the correct network element to exchange signaling, data and operation/maintenance information. The I/O controller 608 may also instruct a sector's low layer processing module 602 to create a second connection with correct RRU. The I/O controller 608 may also create a third connection is the connection between high layer processing module 604 and low layer processing module 602 when they are operating in different processing units.

In some embodiments, the computation resource load monitor 610 may run on each processing unit 112 running the high layer processing module 604 or the low layer processing module 602. The computation resource load monitor 610 may collect the computation load information of a processing unit 112 and may report load information to the computation resource scheduler 618.

In some embodiments, the wireless connection state and data collection module 612 collects a sector's partial or full state and data (i.e., context information) at the higher layer and may send the collected context information to a destination processing unit. Wireless connection state and data restore module 614 may operate a destination processing unit (one of processing units 112) and may receive the contexts from a source processing unit (another of processing units 112) and may initialize that sector's state and data.

The wireless connection state and data update module 616 may update the restored state and data on the destination processing unit. It may assume that low layer communication between the BS and a UE have failed between the migration point and the restart point.

Figure 7:
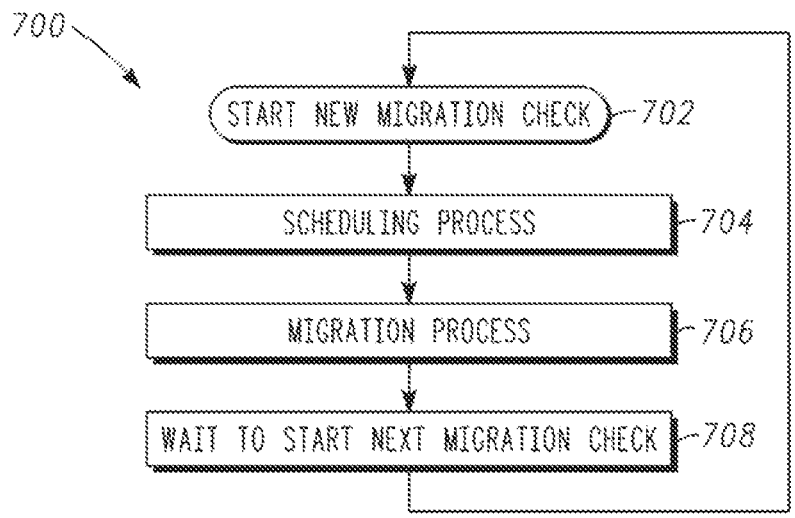
FIG. 7 illustrates a process performed by a computation resource scheduler 618 in accordance with some embodiments.

The computation resource scheduler 618 may operate as a central controller of the system. It may perform a scheduling process and a migration process as illustrated in FIG. 7. The function of the computation resource scheduler 618 may be performed by a single processing unit 112 or may be distributed among several processing units 112.

FIG. 7 illustrates a process performed by a computation resource scheduler 618 in accordance with some embodiments. Process 700 is performed when starting a new migration check 702. Process 700 includes a scheduling process 704, a migration process 706 and waiting to start the next migration check in operation 708.

Figure 8:
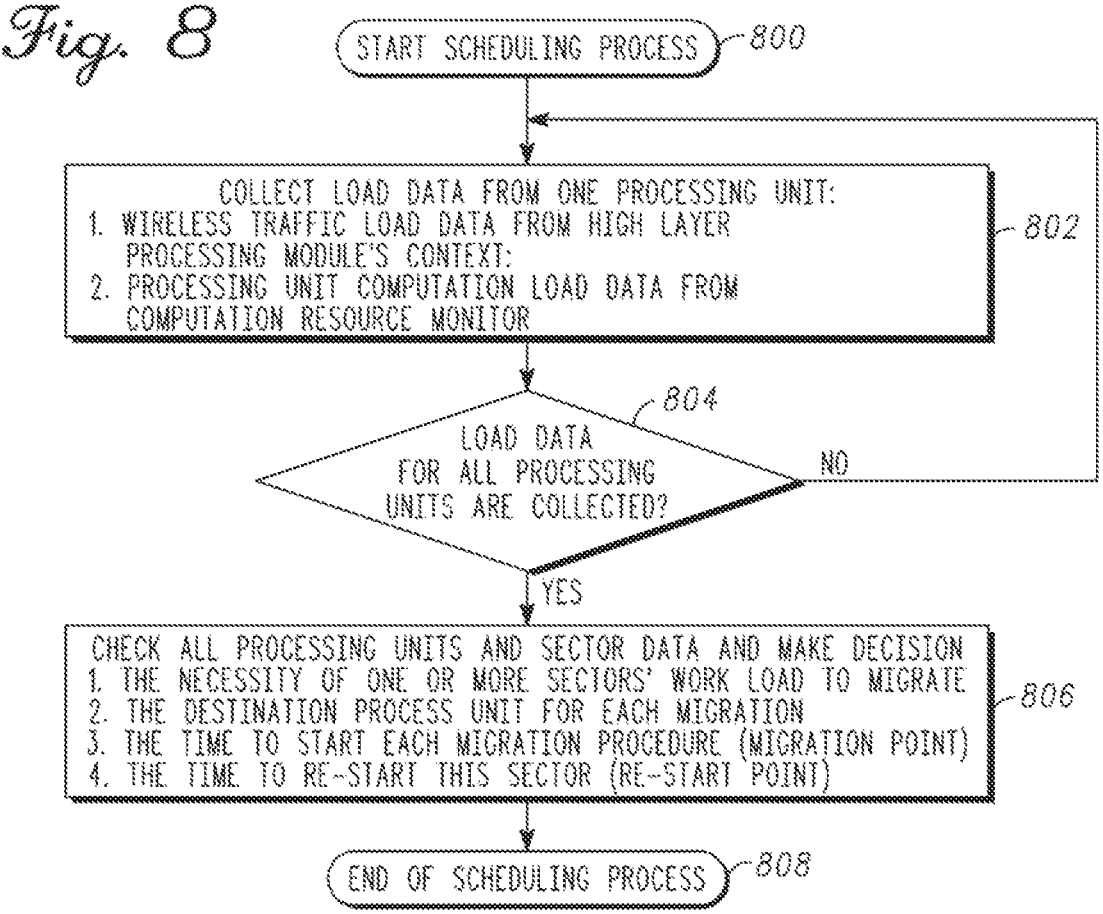
FIG. 8 is a scheduling process in accordance with some embodiments

FIG. 8 is a scheduling process in accordance with some embodiments. Scheduling process 800 may correspond to scheduling process 704 (FIG. 7).

In operation 802, wireless traffic load information is collected from the context of the high layer processing module 604 and the processing unit's computation load information is collected from computation resource load monitor 610. This operation may also get information from the task controller 606.

Operation 804 determines if the load data for the processing units has been collected. As illustrated, operation 802 may be performed until the load data for the processing units is collected.

In operation 806, a set of decisions is made regarding migration for each sector. The decisions include whether or not to migrate the workload of each of the sectors, when to start the migration process for each sector (i.e., the migration point), and where (i.e., a destination processing unit) to migrate the workload of a sector. Operation 806 may also include deciding when to re-start migration of a sector (i.e., a restart point). Operation 808 ends the scheduling process.

FIG. 9 illustrates a migration process for a single sector in accordance with some embodiments. Migration process 900 corresponds to operate 706 (FIG. 7). The migration process 900 may be repeated for each sector in which migration is selected.

In operation 902, the migration process 900 may start a new thread on a destination processing unit when there is no idle thread of this functional module on the destination processing unit. It may indicate to switch interconnection at the proper time.

Operation 904 waits until the current time is equal to the migration point time.

In operation 906, the I/O controller 609 may be indicated to switch the connection of the sector to the correct switch position (i.e., of raw data switch network 108 (FIG. 1B)).

In operation 908, when both the low layer processing module 602 migrates and the high layer processing module 604 are to migrate, operations 912, 914 and 916 are performed.

In operation 912, the wireless connection state and data collection module 612 operating on the source processing unit may be instructed to collect partial or full high layer processing state and data for this sector and may be instructed to send the collected context to the target processing unit.

In operation 914, the wireless connection state and data restore module 614 on the target processing unit may be instructed to receive context from the transmission from step 612 and to restore the context.

In operation 916, the wireless connection state update module 616 on the target processing unit may be instructed to update the high layer processing state and data according to the migration point and the re-start point. The wireless connection state update module 616 on the target processing unit may also be instructed to activate this sector when the current time is equal to the re-start time.

In these operations 912, 914 and 916 (when high layer processing module migration is performed), context is collected and restored on the target and destination processing units and finally the context is updated so that the air interface timing relationship is maintained.

In operation 908, when only the low layer processing module 602 migrates and the high layer processing module 604 does not migrate operation 910 is performed in which the context of the high layer processing module 604 can be updated when the interconnection switch is slow. When the interconnection switch is fast, there is no context update. In operation 910, the wireless connection state update module 606 operating on the target processing unit may be instructed to update the high layer processing state and data according to the migration point and re-start point, and may be instructed to activate this sector when current time is equal to the re-start time.

Operation 918 indicates the end of the migration for the sector. Procedure 900 may be performed concurrently for each sector that is being migrated.

Figure 10A:
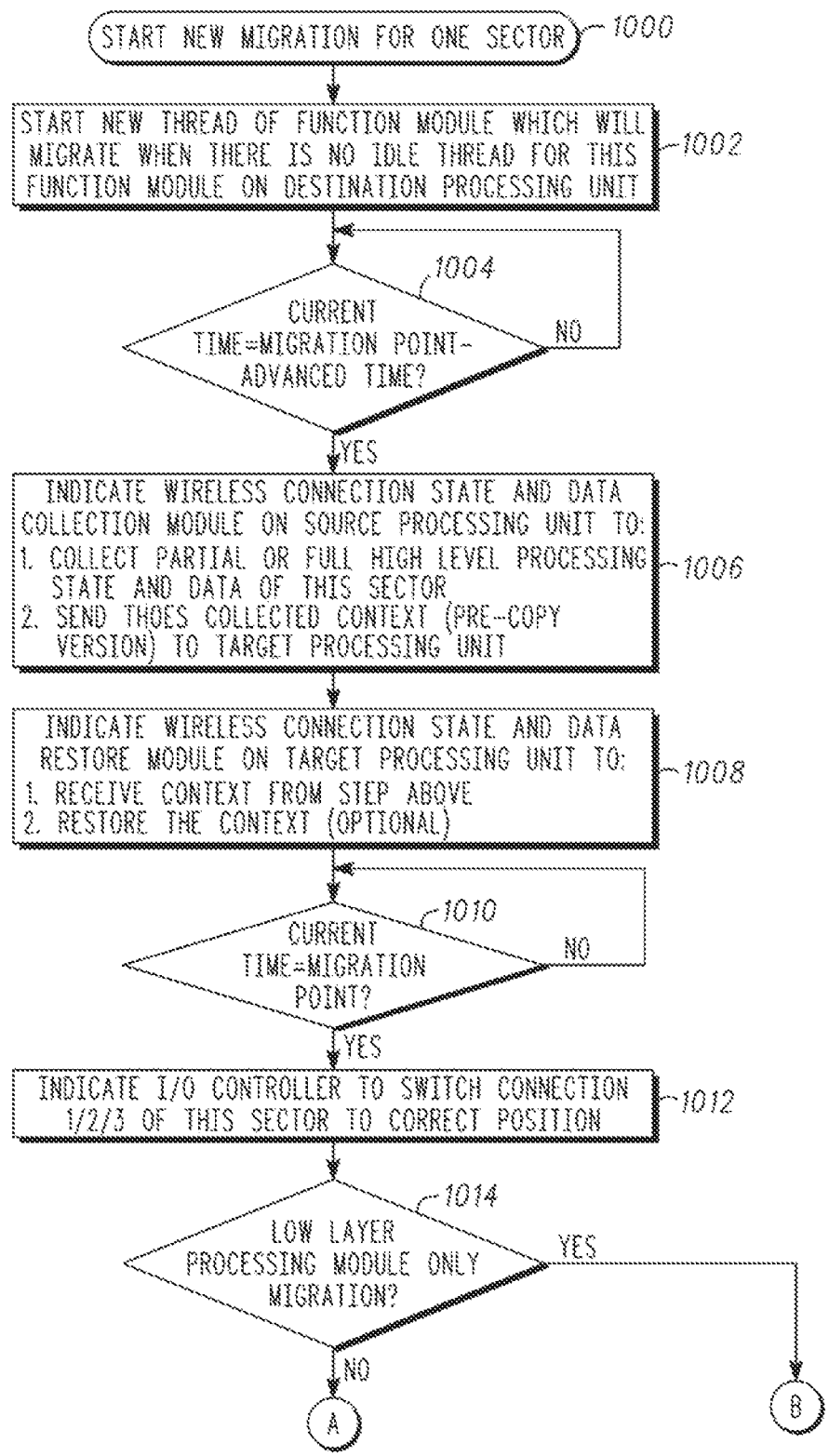
FIG. 10 illustrates a migration process for a single sector in accordance with some alternate embodiments.
Figure 10B:
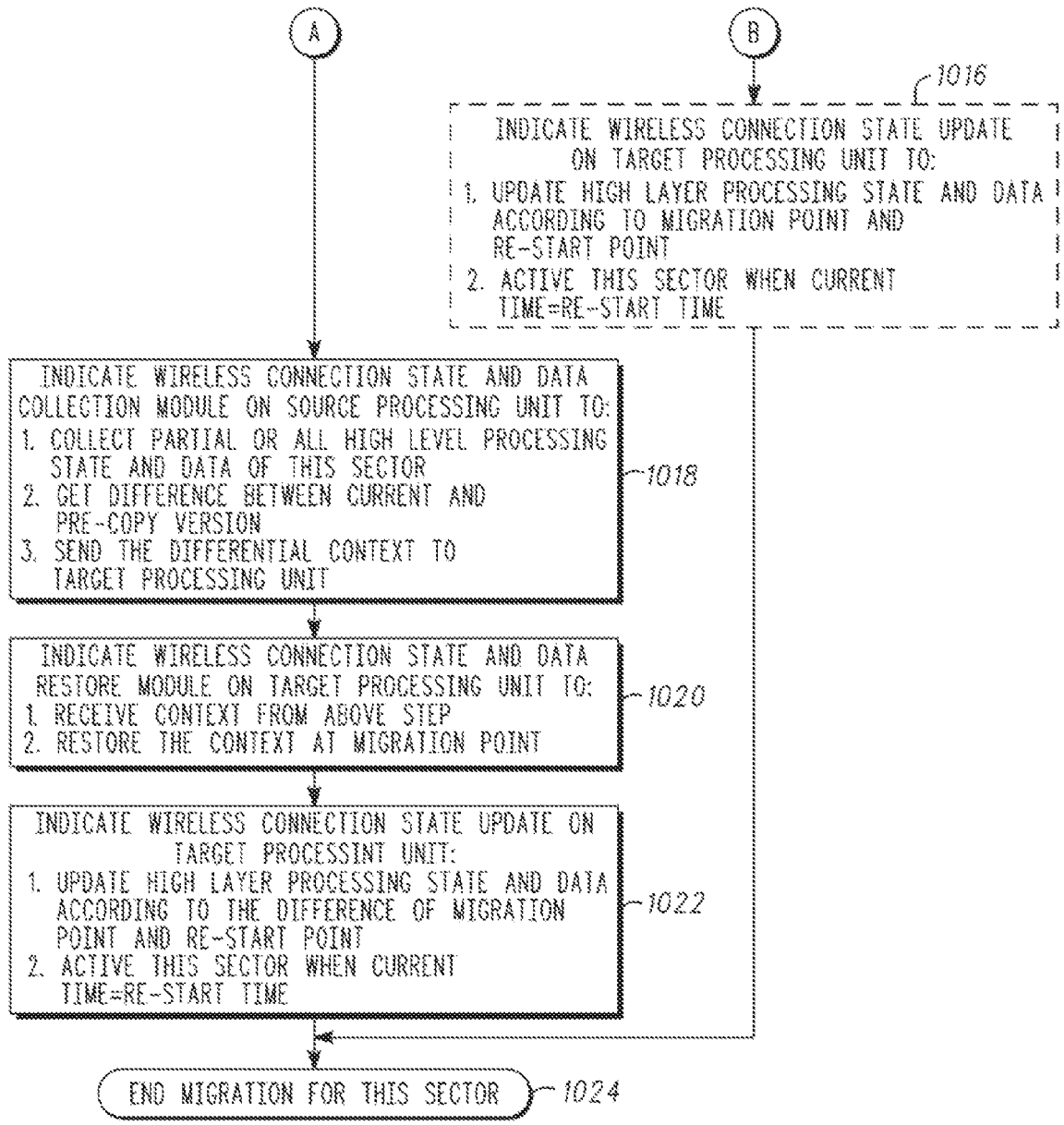

FIG. 10 illustrates a migration process for a single sector in accordance with some alternate embodiments. Migration process 1000 may be performed for a particular sector and may utilize a pre-copy technology to further reduce the amount of data to be transferred during migration. In these embodiments, migration process 1000 may utilize an advanced time parameter to allow the migration process 1000 to run a pre-copy process in advance. These embodiments are described in more detail below.

In operation 1002, the migration process 1000 may start a new thread on a destination processing unit when there is no idle thread of this functional module on the destination processing unit. It may indicate to switch interconnection at the proper time.

Operation 1004 may wait until the current time is the migration point time minus the advanced time.

In operation 1006, the wireless connection state and data collection module 612 operating on the source processing unit may be instructed to collect partial or full high layer processing state and data for this sector and to send the collected context (a pre-copy version) to target processing unit.

In operation 1008, the wireless connection state and data restore module 614 that is operating on the target processing unit may be instructed to receive the context (the pre-copy version) from operation 6006 and optionally restore the context.

Operation 1010 may wait until the current time is equal to the migration point.

In operation 1012, the I/O controller 608 may be instructed to switch connections 1/2/3 of the sector to the correct position In operation 1014, when both the low layer processing module 602 migrates and the high layer processing module 604 are to migrate, operations 1018, 1020 and 1022 are performed. When only the low layer processing module 602 is to migrates, operation 1016 is performed.

In operation 1018, the wireless connection state and data collection module 612 operating on the source processing unit may be instructed to collect partial or full high layer processing state and data for this sector, determine the difference between the current context and the pre-copy version, and send the differential context to the target processing unit.

In operation 1020, the wireless connection state and data restore module 614 that is operating on the target processing unit may be instructed to receive the differential context generated in operation 1018, and to restore the context at the migration point.

In operation 1022, the wireless connection state update module 616 that is operating on the target processing unit may be instructed to update the high layer processing state and data according to the difference between the migration point and re-start point and activate this sector when current time is equal to the re-start time.

In operation 1016, the wireless connection state update module 616 that is operating on the target processing unit may be instructed to update the high layer processing state and data according to the difference between the migration point and the re-start point, and activate this sector when current time is equal to the re-start time.

Operation 1024 indicates the end of the migration for the sector. Procedure 1024 may be performed concurrently for each sector that is being migrated.

In some embodiments, the task controller 606 may coordinate the collection of state and data, the restoration and the updating depending on the number of contexts that are being migrated.

In some embodiments, when all high layer contexts migrate, MAC, RLC and PDCP context may be updated each transmission time interval (TTI) between the migration point and the restart point. When partial contexts migrate, there are many possibilities. For example, only PDCP and above layers state and data may be updated, the RLC, PDCP and above layers state and data may be updated, and/or the MAC state, RLC, PDCP and above layers state and data may be updated. In these embodiments, when partial contexts migrate, only those contexts need to be updated.

Although the hardware architecture 100 and the software architecture 600 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the architectures 100 and 600 may refer to one or more processes operating on one or more processing elements.

Some embodiments of the architectures 100 and 600 may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the architectures 100 and 600 may include one or more processors and may be configured with instructions stored on a computer-readable storage device.

In one example, an enhanced Node B (eNB) configured for use in a cooperative radio access network (C-RAN) comprises a base-band unit (BBU) processing pool comprising a plurality of processing units, the BBU processing pool configured to share a processing load of several sectors, and a control unit to monitor the processing load of the processing units and perform dynamic load sharing by migrating base-band processing between the processing units without changing a carrier used by user equipment operating with a sector.

In another example, the eNB may comprise a traffic data switch network to switch traffic packets between a core network the processing units of the BBU processing pool based on instructions provided by the control unit, a front-end unit to communicate antenna signals with a plurality of remote-radio units (RRUs), and a raw data switch network to couple the antenna signals from the front-end unit to selected ones of the processing units of the BBU processing pool based on instructions provided by the control unit.

In another example, the front-end unit may include an RRU interface including fiber for multiplexing and demultiplexing the antenna signals, and a pre-processing unit to perform fixed signal processing operations on the antenna signals including FFT/IFFT and PRACH functions. The preprocessing unit receives uplink antenna signals from the RRU interface and provides processed antenna signals to the raw data switch network. The preprocessing unit processes downlink signals received from the raw data switch network and provides downlink antenna signals to the RRU interface.

In another example, the pre-processing unit includes a resource block (RB) selection unit to select resource blocks for uplink and downlink communications with the user equipment based on instructions from a MAC scheduler.

In another example, the control unit comprises a migration control element configured to manage sector processing within the BBU processing pool including to monitor the processing load of the processing units and to migrate the baseband processing of the sectors among the processing units for power consumption reduction. The BBU processing pool is configured to provide commands to the processing units to turn-on and turn-off the processing units.

In another example, the migration control element further comprises a switch control unit to control the raw data switch network and the traffic data switch network according to decisions of the migration control element to switch corresponding antenna data and traffic data among the processing units.

In another example, the migration control element may include a core network interface to provide an interface with the core network, a control plane to implement a control plane protocol for sector processing within the BBU processing pool, and a radio-resource manager (RRM) to manage radio resources for the sectors.

In an example, the fixed signal processing operations performed by the pre-processing unit and the resource block selection operations performed by the pre-processing unit are performed at the eNB.

In another example, the fixed signal processing operations performed by the pre-processing unit are performed at a RRU and the resource block selection operations performed by the pre-processing unit are performed at the eNB.

In another example, the fixed signal processing operations performed by the pre-processing unit and the resource block selection operations performed by the pre-processing unit are performed at an RRU.

In some embodiments, an enhanced Node B (eNB) is configured for use in a cooperative radio access networks (C-RAN). In these embodiments, the eNB comprises abaseband unit (BBU) processing pool comprising a plurality of processing units, the BBU processing pool configured to share a processing load of several sectors, a computation resource scheduler configured to schedule migration of the processing load of one sector from a source processing unit to a destination processing unit of the BBU processing pool, and a computation resource load monitor to run on each processing unit to collect computation load information for each sector for the processing unit and provide the collected load information to the computation resource scheduler.

In an example, the eNB may further comprise a wireless connection state and data collection module to collect context information, including state and data for a sector and to send the collected context information to the destination processing unit in response to instructions for migration from the computation resource scheduler, a wireless connection state and data restore module to operate on the destination processing unit and configured to receive the contexts from the source processing unit and to initialize the sector's state and data in response to instructions for migration from the computation resource scheduler, and a wireless connection state and data update module to operate on the destination processing unit and configured to update the restored state and data on the destination processing unit in response to instructions for migration from the computation resource scheduler.

In an example, the eNB may further comprise a low layer processing module to run on the processing units for implementing lower-layer operations of a wireless protocol, a high layer processing module to run on the processing units for implementing higher layer operations of the wireless protocol, and a task controller for controlling the operations of the low layer processing module and the high layer processing module. The computation resource load monitor is to collect computation load information from both the low and high layer processing modules.

In an example, when operations performed by at least a high layer processing module are to migrate between processing units, context is collected and restored on target and destination processing units and the context is updated to maintain air interface timing. When operations performed by the low layer processing module are to migrate between processing units and the operations performed a corresponding high layer processing module are not to migrate, the wireless connection state update module operating on the target processing unit is instructed to update the high layer processing state and data according to a migration point and re-start point and is instructed to activate a sector when a current time is equal to a re-start time.

In an example, when operations performed by at least a high layer processing module are to migrate between processing units, the wireless connection state and data collection module operating on the source processing unit is instructed to collect partial or full high layer processing state and data for the sector, determine a difference between the current context and a pre-copy version, and send the differential context to the target processing unit.

In some example embodiments, a method for operating an enhanced Node B (eNB) in a cooperative radio access network (C-RAN) is provided. The method includes monitoring processing load of processing units of a base-band unit (BBU) processing pool comprising a plurality of processing units, the BBU processing pool configured to share a processing load of several sectors, and performing dynamic load sharing by migrating baseband processing between the processing units without changing a carrier used by user equipment operating with a sector.

In an example, the method may also include switching traffic packets between a core network the processing units of the BBU processing pool based on instructions provided by a control unit, communicating antenna signals with a plurality of remote-radio units (RRUs), and coupling the antenna signals from the front end unit to selected ones of the processing units of the BBU processing pool based on instructions provided by the control unit.

In an example, the method may also include controlling a raw data switch network and a traffic data switch network according to decisions of a migration control element to switch corresponding antenna data and traffic data among the processing units.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An enhanced Node B (eNB) configured for use in a cooperative radio access network (C-RAN), the eNB comprising:
a base-band unit (BBU) processing pool comprising a plurality of processing units, the BBU processing pool configured to share a processing load of several sectors;
a control unit to monitor the processing load of the processing units and perform dynamic load sharing by migrating baseband processing between the processing units without changing a carrier used by user equipment (UE) operating with a sector;
a traffic data switch network to switch traffic packets between a core network the processing units of the BBU processing pool based on instructions provided by the control unit;
a front-end unit to communicate antenna signals with a plurality of remote-radio units (RRUs); and
a raw data switch network to couple the antenna signals from the front-end unit to selected ones of the processing units of the BBU processing pool based on instructions provided by the control unit,
wherein the front-end unit includes:
an RRU interface including fiber for multiplexing and demultiplexing the antenna signals; and
a pre-processing unit to perform fixed signal processing operations on the antenna signals including FFT/IFFT and PRACH functions,
wherein the pre-processing unit receives uplink antenna signals from the RRU interface and provides processed antenna signals to the raw data switch network,
wherein the pre-processing unit processes downlink signals received from the raw data switch network and provides downlink antenna signals to the RRU interface,
wherein the pre-processing unit includes resource block (RB) selection circuitry to select resource blocks for uplink and downlink communications with the user equipment based on instructions from a MAC scheduler, and
wherein the fixed signal processing operations performed by the pre-processing unit and the resource block selection operations performed by the pre-processing unit are performed at an RRU.

2. An enhanced Node B (eNB) configured for use in a cooperative radio access networks (C-RAN), the eNB comprising:
a base-band unit (BBU) processing pool comprising a plurality of processing units, the BBU processing pool configured to share a processing load of several sectors, the processing units configured to separately implement lower-layer operations and higher-layer operations of a wireless protocol;
a computation resource scheduler configured to schedule migration of the processing load associated with at least one of the lower-layer operations and the higher layer-operations of one sector from a source processing unit to a destination processing unit of the BBU processing pool; and
a computation resource load monitor to run on each processing unit to collect computation load information for the lower-layer operations for each sector for each processing unit and to collect computation load information for the higher-layer operations for each sector for each processing unit and provide the collected computation load information to the computation resource scheduler,
wherein depending on the processing loads of the source and destination processing units, the collected computation load information is configurable to schedule migration of the processing load associated with one of the lower-layer operations and the higher-layer operations and refrain from scheduling migration of the processing load associated with the other of the lower-layer operations and the higher-layer operations for a sector.

3. The eNB of claim 2, wherein:
the source processing unit is configured with a wireless connection state and data collection module to collect context information, including state and data for the one sector and to send the collected context information to the destination processing unit in response to instructions for migration from the computation resource scheduler;
a wireless connection state and data restore module to operate on the destination processing unit and is configured to receive the collected context information from the source processing unit and to initialize state and data for the one sector in response to instructions for migration from the computation resource scheduler; and
a wireless connection state and data update module to operate on the destination processing unit is and configured to update state and data on the destination processing unit in response to instructions for migration from the computation resource scheduler.

4. The eNB of claim 2 further comprising:
a control unit to monitor the processing load of the processing units and perform dynamic load sharing by migrating baseband processing between the processing units without changing a carrier used by user equipment (UE) operating with the one sector,
wherein as part of the dynamic load sharing, the control unit is further configured to refrain from migrating at least some physical-layer processes to allow the UE to remain on a same carrier when the baseband processing for the UE is migrated between processing units of the BBU processing pool.

5. The eNB of claim 4 further comprising:
a traffic data switch network to switch traffic packets between a core network and the processing units of the BBU processing pool based on instructions provided by the control unit;
a front-end unit to communicate antenna signals with a plurality of remote-radio units (RRUs); and
a raw data switch network to couple the antenna signals from the front-end unit to selected ones of the processing units of the BBU processing pool based on instructions provided by the control unit.

6. The eNB of claim 5 wherein the front-end unit includes:
an RRU interface including fiber for multiplexing and demultiplexing the antenna signals; and
a pre-processing unit to perform fixed signal processing operations on the antenna signals including FFT/IFFT and PRACH functions,
wherein the pre-processing unit receives uplink antenna signals from the RRU interface and provides processed antenna signals to the raw data switch network, and
wherein the pre-processing unit processes downlink signals received from the raw data switch network and provides downlink antenna signals to the RRU interface.

7. The eNB of claim 6 wherein the pre-processing unit is configured to select resource blocks for uplink and downlink communications with the user equipment based on instructions from a MAC scheduler.

8. The eNB of claim 5 wherein the control unit comprises a migration control element configured to manage sector processing within the BBU processing pool including to monitor the processing load of the processing units and to migrate the baseband processing of the sectors among the processing units for power consumption reduction,
wherein the BBU processing pool is configured to provide commands to the processing units to turn-on and turn-off the processing units.

9. The eNB of claim 8 wherein the migration control element further comprises switch control circuitry to control the raw data switch network and the traffic data switch network according to decisions of the migration control element to switch corresponding antenna data and traffic data among the processing units.

10. The eNB of claim 9 wherein the migration control element further comprises:
a core network interface to provide an interface with the core network;
a control plane to implement a control plane protocol for sector processing within the BBU processing pool; and
a radio-resource manager (RRM) to manage radio resources for the sectors.

11. The eNB of claim 7 wherein the fixed signal processing operations performed by the pre-processing unit and the resource block selection operations performed by the pre-processing unit are performed at the eNB.

12. The eNB of claim 7 wherein the fixed signal processing operations performed by the pre-processing unit are performed at a RRU and the resource block selection operations performed by the pre-processing unit are performed at the eNB.

13. An enhanced Node B (eNB) configured for use in a cooperative radio access networks (C-RAN), the eNB comprising:
a base-band unit (BBU) processing pool comprising a plurality of processing units, the BBU processing pool configured to share a processing load of several sectors, the processing units configured to implement lower-layer and higher-layer operations of a wireless protocol;
a task controller configured to control the higher-layer operations and the lower-layer operations;
a computation resource scheduler configured to schedule migration of the processing load of one sector from a source processing unit to a destination processing unit of the BBU processing pool; and
a computation resource load monitor to run on each processing unit to collect computation load information for each sector for the processing unit from both the lower-layer operations and the higher-layer operations and provide the collected load information to the computation resource scheduler,
wherein the source processing unit is configured to collect context information of a context, including state and data for the one sector and to send the collected context information to the destination processing unit in response to instructions for migration from the computation resource scheduler;
wherein the destination processing unit is configured to receive the collected context information from the source processing unit and to initialize state and data for the one sector in response to instructions for migration from the computation resource scheduler; and
wherein the destination processing unit is configured to update state and data on the destination processing unit in response to instructions for migration from the computation resource scheduler,
wherein when the higher-layer operations are to migrate between processing units, the context information is collected and restored on target and destination processing units and the context is updated to maintain air interface timing, and
wherein when the lower-layer operations are to migrate between processing units and the higher-layer operations are not to migrate, a wireless connection state update module operating on the target processing unit is instructed to update a higher-layer processing state and data according to a migration point and re-start point and is instructed to activate the one sector when a current time is equal to a re-start time.

14. An enhanced Node B (eNB) configured for use in a cooperative radio access networks (C-RAN), the eNB comprising:
a base-band unit (BBU) processing pool comprising a plurality of processing units, the BBU processing pool configured to share a processing load of several sectors, the processing units configured to implement lower-layer and higher-layer operations of a wireless protocol;
a task controller configured to control the higher-layer operations and the lower-layer operations;
a computation resource scheduler configured to schedule migration of the processing load of one sector from a source processing unit to a destination processing unit of the BBU processing pool; and
a computation resource load monitor to run on each processing unit to collect computation load information for each sector for the processing unit from both the lower-layer operations and the higher-layer operations and provide the collected load information to the computation resource scheduler,
wherein the source processing unit is configured to collect context information of a context, including state and data for a sector and to send the collected context information to the destination processing unit in response to instructions for migration from the computation resource scheduler;
wherein the destination processing unit is configured to receive the collected context information from the source processing unit and to initialize state and data for the one sector in response to instructions for migration from the computation resource scheduler; and
wherein the destination processing unit is configured to update state and data on the destination processing unit in response to instructions for migration from the computation resource scheduler,
wherein when the higher-layer operations are to migrate between processing units, the source processing unit is instructed to collect partial or full high layer processing state and data for the one sector, determine a difference between a current context and a pre-copy version of the context, and send a differential context to a target processing unit.

* * * * *